June 12, 1945.  R. A. SOPP  2,378,336
MACHINE FOR EVERTING BALL CASINGS AND SIMILAR ARTICLES
Filed Aug. 11, 1944  6 Sheets-Sheet 1

INVENTOR.
RICHARD A. SOPP

INVENTOR.
RICHARD A. SOPP
BY

June 12, 1945. R. A. SOPP 2,378,336
MACHINE FOR EVERTING BALL CASINGS AND SIMILAR ARTICLES
Filed Aug. 11, 1944 6 Sheets-Sheet 5

INVENTOR.
RICHARD A. SOPP
BY

June 12, 1945.   R. A. SOPP   2,378,336
MACHINE FOR EVERTING BALL CASINGS AND SIMILAR ARTICLES
Filed Aug. 11, 1944   6 Sheets-Sheet 6

INVENTOR.
RICHARD A. SOPP
BY

Patented June 12, 1945

2,378,336

UNITED STATES PATENT OFFICE 2,378,336

MACHINE FOR EVERTING BALL CASINGS AND SIMILAR ARTICLES

Richard A. Sopp, St. Louis, Mo., assignor to Rawlings Manufacturing Company, St. Louis, Mo., a corporation of Missouri Application August 11, 1944, Serial No. 549,114

18 Claims. (Cl. 69—1)

This invention relates to a machine for everting, or turning inside-out, a hollow, shell-like object or article, composed of a plurality of pieces of flexible material, whose edge portions are joined together while said pieces are inverted, or arranged with their finished sides or outer surfaces disposed on the interior of the article.

One object of my invention is to provide a machine or mechanical means, for everting a leather ball casing at the completion of the sewing operation, thereby eliminating a hand operation in the manufacture of foot balls, basket balls and similar inflated balls, which frequently restricts or cuts down the out-put of a factory, due to the difficulty or impossibility of obtaining workmen who are willing to perform the operation, or who are capable of performing the operation.

Another object of my invention is to overcome or eliminate the necessity of a high degree of skill, strong, rugged hands, and exceptional finger dexterity, on the part of a workman, during the operation of turning a leather ball casing inside out, after the sewing or stitching operation of the casing has been completed.

Another object is to provide a machine that will evert a casing or substantially shell-like article made of leather or other flexible material, without tearing the material of which it is constructed, or straining the seams or joints of the article.

And still another object of my invention is to provide a ball casing evertor, that is easy to manipulate and control, and which is of such design or construction, that after the casing has been arranged in operative position, in the machine, and the machine set in operation, the coacting parts of the machine will quickly and efficiently turn the casing inside-out, without liability of tearing or unduly stretching the casing.

The conventional casing used for foot balls, basket balls and similar inflated balls, is composed of a plurality of sections of leather, or other suitable flexible material, whose edge portions are sewed together in such a manner as to produce a hollow, flexible shell provided with a slit or opening through which the bladder of the ball can be inserted when the bladder is in a deflated condition. The casing is sewed "on the wrong side," or with the finished surfaces of the leather sections presented inwardly, and at the completion of the sewing operation, the casing is everted, or turned inside-out, so that the finished surfaces of the leather sections will be presented outwardly, or, in other words, disposed on the exterior of the casing. Prior to my invention, the above mentioned eversion operation was always performed by hand-line 23, and usually involved positioning the casing on a stationary post or upright in such a way that the end of the post engaged the outer side of the portion of the casing disposed substantially opposite the bladder opening in the casing, and then grasping the portion of the casing at points adjacent the bladder opening and working the casing downwardly over the post, thus, in effect, causing the post to force or push the underside or bottom portion of the casing upwardly through the bladder opening, and resulting in turning the casing inside-out. The above mentioned procedure not only requires considerable skill on the part of the workmen performing the operation, but it is necessary that the workmen have exceptionally great finger dexterity and strong, rugged hands. Still another objection to the above mentioned procedure is, that the force required to manipulate the leather casing, which, in most instances, is relatively stiff and unyielding, and draw it downwardly over and around the post, is very fatiguing to the workmen's hands, and invariably, produces callouses and sore spots on the workman's hands. In fact, this one operation of manually everting leather ball casings, can reduce or cut down the output of a factory engaged in the manufacture of inflated balls, due to the difficulty, and in some instances, impossibility of obtaining workmen who are willing to perform the operation, or who have sufficient strength and skill to perform the operation. Also said hand eversion operation has the objection of being practically restricted to male workers, as the arms and hands of the average female worker are not strong enough or tough enough to perform the operation hour after hour and day after day.

The machine that I have devised for everting ball casings and other flexible shell-like articles provided at one point with a slit or opening, overcomes all of the previously mentioned objections to the conventional hand operation of turning a sewed ball casing inside-out. Briefly described, said machine consists of or comprises the following main elements:

1. Clamps or equivalent devices that are adapted to grasp, embrace or be engaged with the perimeter or peripheral edge of the slit or opening in the casing;

2. A means that is adapted to be engaged with the outer side of the casing at a point remote from the slit or opening in the casing;

3. Mechanism for producing relative movement between said clamps and member, in a direction to cause the slitted portion of the casing to be drawn over said means, or the portion of the casing engaged by said means to be forced or pushed through the slit in the casing; and 4. Mechanism for causing said clamps to automatically assume such a position or condition during the eversion operation, that they will not tear the casing, or cause the casing to be subjected to a destructive or injurious strain.

So far as my broad idea is concerned, it is immaterial whether the clamps are moved bodily relatively to a casing-engaging means that is stationarily mounted, or whether the casing-engaging means is moved bodily relatively to clamps that remain at rest during the major portion of the eversion operation, as both of said procedures produce the same effect or result, i. e., evert the casing and cause it to be arranged on the casing-engaging member, with the finished surface of the material of which the casing is constructed, disposed on the exterior of the casing. The particular construction of the clamps and the way in which they are operated, and the particular construction and operation of the casing-engaging means are also immaterial, so far as my broad idea is concerned.

In the machine herein illustrated, which is primarily designed to be used for everting a sewed leather casing for an inflated ball, the above mentioned casing-engaging means consists of a movable ram. The clamps or equivalent devices that grip or embrace the perimeter or peripheral edge of the bladder opening in the casing, are constructed and arranged so that they are at rest during the first portion of the eversion operation, and near the end of said operation, a change is effected in the condition or position of said clamps, for the purpose of preventing said clamps from tearing or straining the casing, and also to cause the casing to disengage itself from said clamps. In addition to the elements previously mentioned, the machine herein illustrated is preferably provided with a stabilizing means and an abutment means that hold the top portion of the casing in a distended condition and oppose and resist movement of same in the general direction of travel of the ram, during the major portion of the eversion stroke of said ram.

Figure 4 is a fragmentary front elevational view, on an enlarged scale, illustrating the relative position of the ram and the clamps near during the eversion operation, and with the casing still engaged by said clamps, the casing and certain parts of the machine being broken away.

Figure 4$^a$ is a perspective view of the ball casing, showing how said casing looks at the completion of the sewing operation, or, in other words, showing the condition of the casing at the time it is set in the everting machine.

Figures 4, 4A:
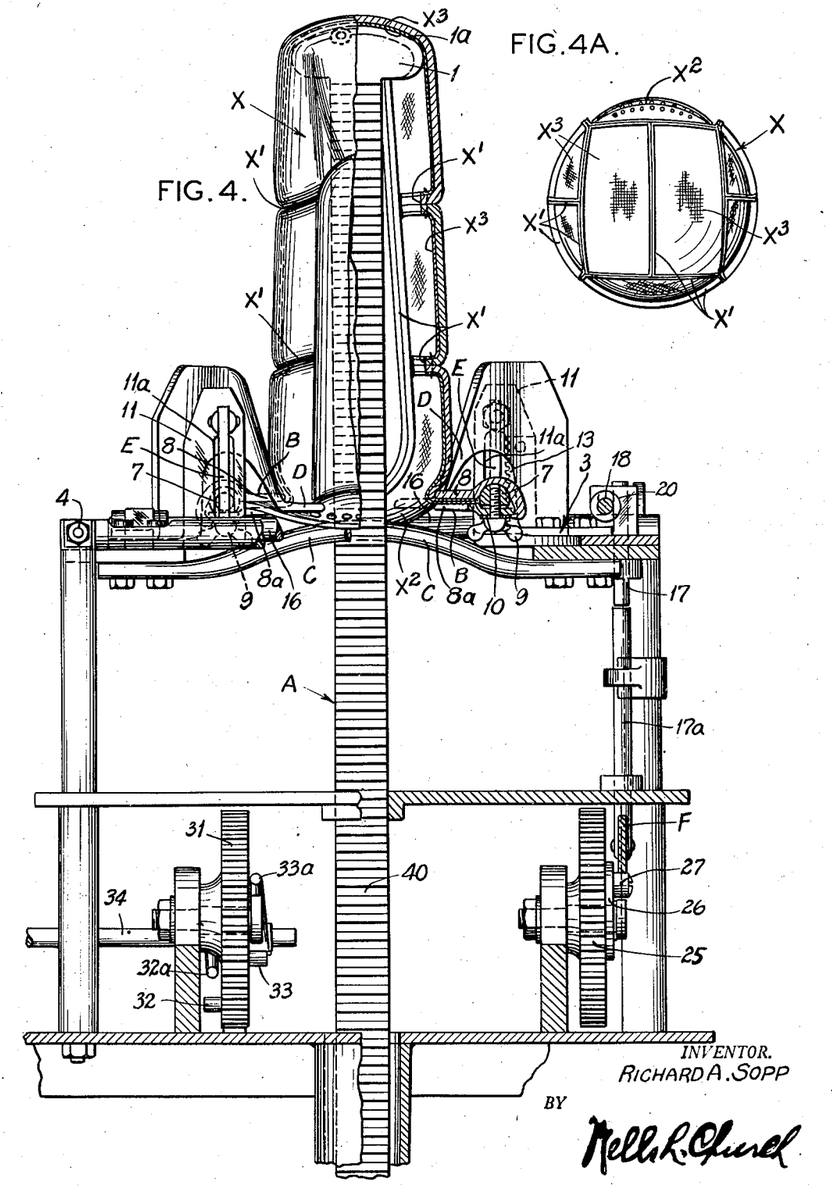

In the drawings, X designates the ball casing on which the machine operates. As shown in Figure 4$^a$, said casing is of conventional construction and is composed of a plurality of pieces or sections of leather joined together by sewed seams $x'$, one of said seams being interrupted at a point intermediate its ends, so as to produce a slit or opening $x^2$ in the casing, through which the bladder of the ball can be inserted in the casing, after the casing has been turned inside-out from the condition shown in Figure 4$^a$. Usually, the casing will comprise an inner lining $x^3$ of fabric, that is disposed on the interior of the casing of the finished ball, but which is located on the exterior of the casing at the completion of the sewing operation, or before the casing has been everted.

Figure 1:
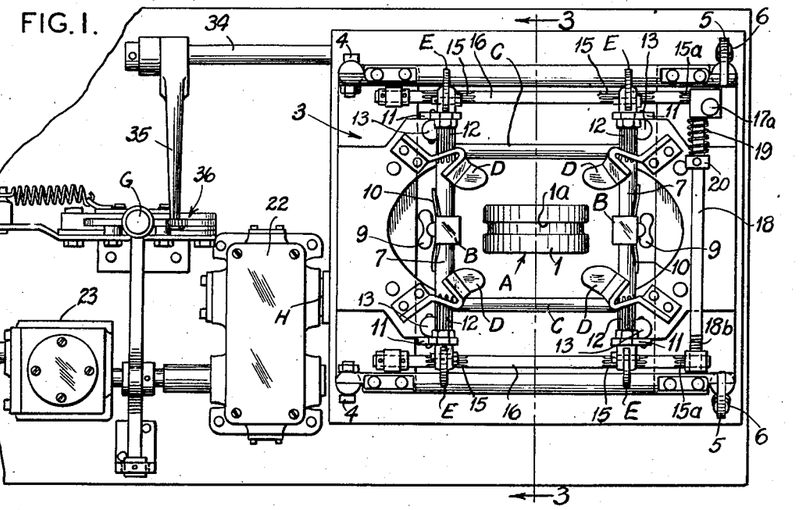
Figure 1 of the drawings is a top plan view of my improved machine.
Figures 3, 11:
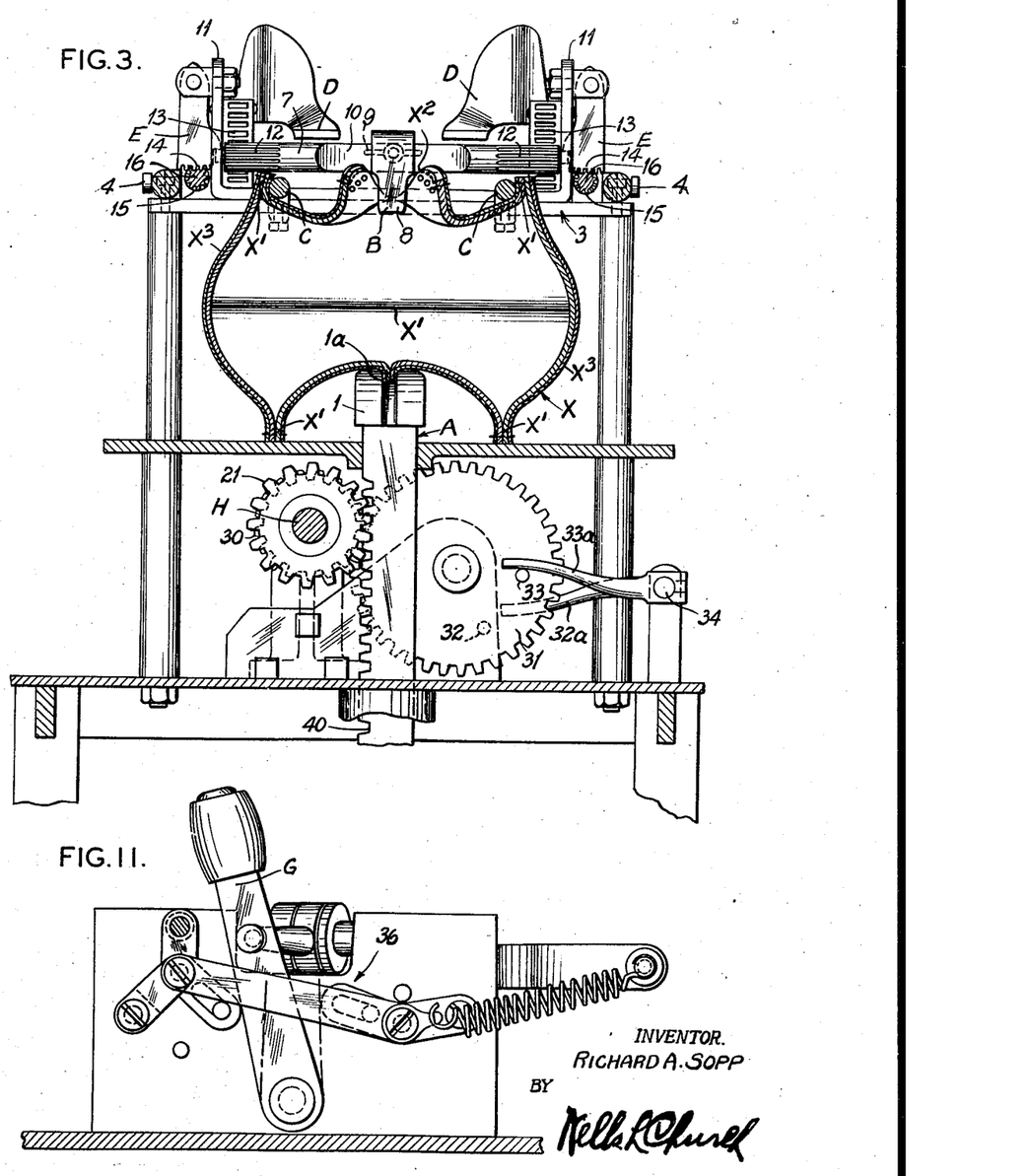
Figure 3 is a vertical transverse sectional view, taken on the line 3—3 of Figure 1, showing a sewed leather ball casing positioned in the machine, in readiness to be everted or turned inside-out.
Figure 11 is a view of the control lever and the toggle linkage, showing the control lever set in the position to cause the ram to move upwardly.
Figure 5:
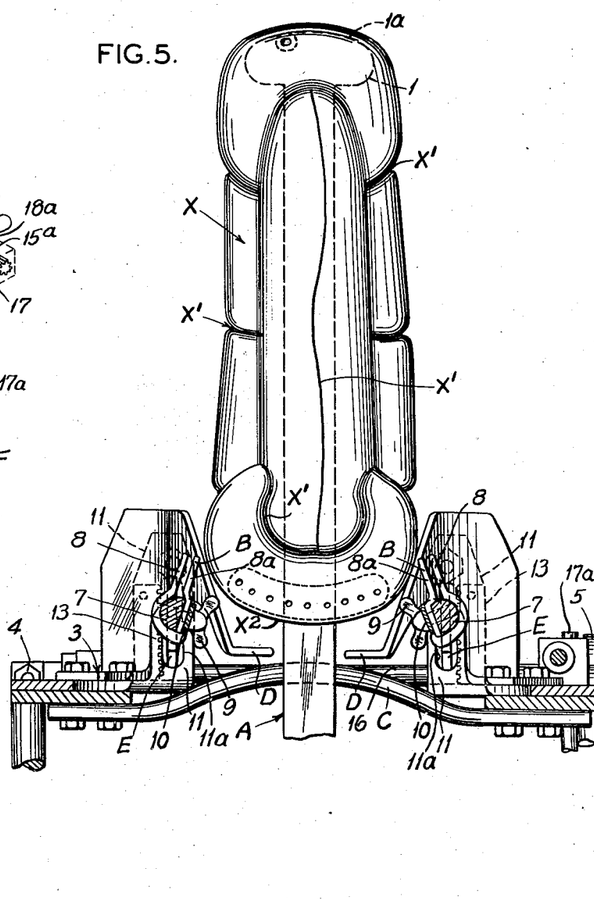
Figure 5 is a view similar to Figure 4, but showing the machine at the completion of the eversion operation, and the casing ready to be removed from the ram.

The reference character A designates the ram of the machine, which is preferably disposed vertically and arranged so that it moves upwardly from the position shown in Figure 3, to the position shown in Figure 5, during the eversion operation, and B designates clamps or equivalent holding devices that are adapted to grip, embrace or be engaged with the perimeter or peripheral edge of the bladder opening $x^2$ in the casing X, so as to hold the top portion of the casing against bodily upward movement, during a considerable part of the upward travel of the ram A. Said ram is provided at its upper end with a head piece I, which is herein illustrated as consisting of a substantially oblong-shaped member, having a slightly round, or convexed surface, and provided with a groove I$^a$ (see Figure 1) that is adapted to receive the center seam on the bottom portion or underside of the casing X when said casing is positioned in the machine, as shown in Figure 1, prior to setting the machine in operation, to cause the casing to be turned inside-out. A head piece of this construction is desirable, because it comprises portions that have a sufficiently wide bearing surface contacting the casing to eliminate the possibility of the casing being strained by the pressure which the ram exerts on same. The clamps B are of such construction and are arranged in such relationship with the ram A, that after the ball casing has been positioned on the ram, as shown in Figure 3, the opposed end portions of the bladder opening $x^2$ in the casing can be engaged with said clamps by slipping said opposed end portions of the casing upwardly into the bifurcations of said clamps, or, in other words, so as to cause the clamps to straddle, embrace, or grip the opposed portions of the casing located at the ends of the bladder slit or opening in the casing. Subsequently, I will describe more fully the construction of the clamps B, but at this time I will point out that when the casing X is in the machine, in readiness to be everted, the clamps B occupy a downwardly-projecting position, and during the eversion operation, said clamps move automatically into an upwardly-projecting position, for the purpose of preventing the clamps B from exerting strains on the casing that might tend to tear or strain the casing, and also to permit the casing to pull out of said clamps, or disengage itself from said clamps approximately at the completion of the eversion operation, before the ram A reaches the end of its upward stroke.

As previously mentioned, the machine is provided with a stabilizing means that tends to hold the top portion of the casing in a distended condition and prevent the portion of the casing from assuming such a condition or position as to interfere with the operation of pushing the lower portion of the casing upwardly through the bladder slit in the casing, and the machine is also provided with an abutment means disposed so that during the eversion operation, said abutment means retards or resists upward movement of the top portion of the casing in which the bladder slit or opening $x^2$ is formed. In the form of my invention herein illustrated, the stabilizing means, mentioned above, consists of two horizontally-disposed, stationary bars C arranged parallel in such relationship with the clamps B, that at the beginning of the eversion operation, said bars C will overlap the top side or portion of the casing, and two of the sewed seams at the top side of the casing will be located outside of said bars C, as shown in Figure 3, whereby any tendency of the top portion of the casing to collapse and permit the sewed seams at the side edges of said top portion to move inwardly towards the bladder slit in the top portion, is counteracted or prevented by the stabilizing bars C. The form and arrangement of the stabilizing bars C is such that in the operation of positioning the casing on the head piece of the ram A, preparatory to the upward movement of said ram, the parts of the top side of the casing located at opposite sides of the bladder opening in the casing, can easily be pushed under the stabilizing bars C, as shown in Figure 3, without the necessity of first manipulating or releasing any kind of a casing holding device. Also, near the end of the eversion operation the sewed seams in the top portion of the casing, that are engaged by the stabilizing bars C, automatically disengage themselves from said bars, without requiring any action on the part of the operator in charge of the machine. The abutment means, previously mentioned, that is used to retard or oppose upward movement of the top part of the casing, during the eversion operation, is formed by four pressure plates D arranged symmetrically around the upward path of travel of the ram A at a point above or in a higher horizontal plane than the clamps B. During the eversion operation, the parts of the top portion of the casing disposed longitudinally of or at the sides of the bladder slit $x^2$ in the casing, will be forced upwardly against the pressure plates D, so as to effectively hold the top portion of the casing against upward movement while the bottom portion of the casing and the side portions of the casing are being forced upwardly through the bladder slit in the top portion of the casing. Similarly to the clamps B, the pressure plates D require no manipulation or adjustment, on the part of the operator in charge of the machine, to render said plates operative to hold one portion of the casing at rest or in a certain approximate position during the upward travel of the ram A. Near the end of the eversion operation, the part of the casing previously forced by the ram against the pressure plates D, will automatically disengage themselves from said pressure plates, thus permitting the casing as an entirety to travel upwardly with the ram during the final portion of the upward stroke of the ram.

Figure 2:
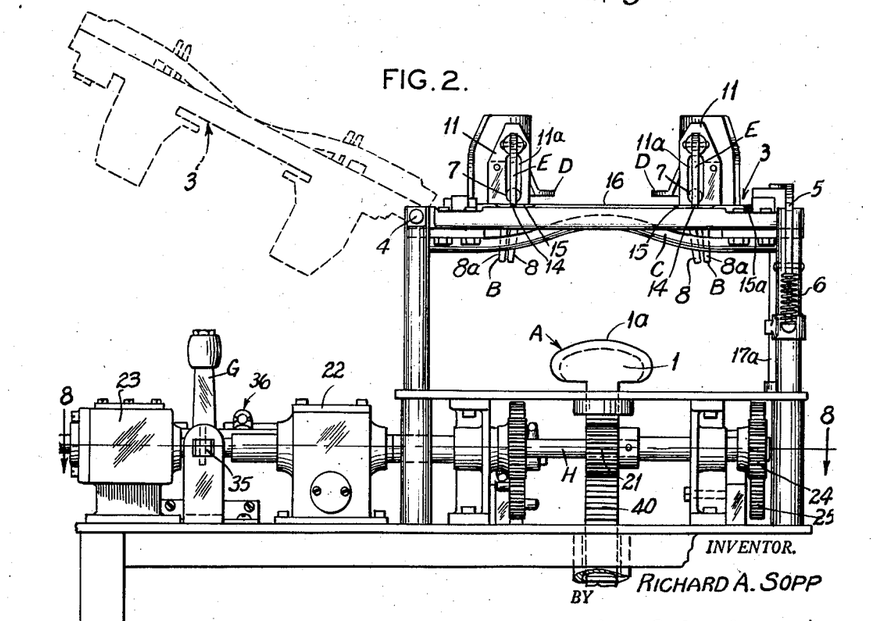
Figure 2 is a front elevational view.
Figures 6, 12:
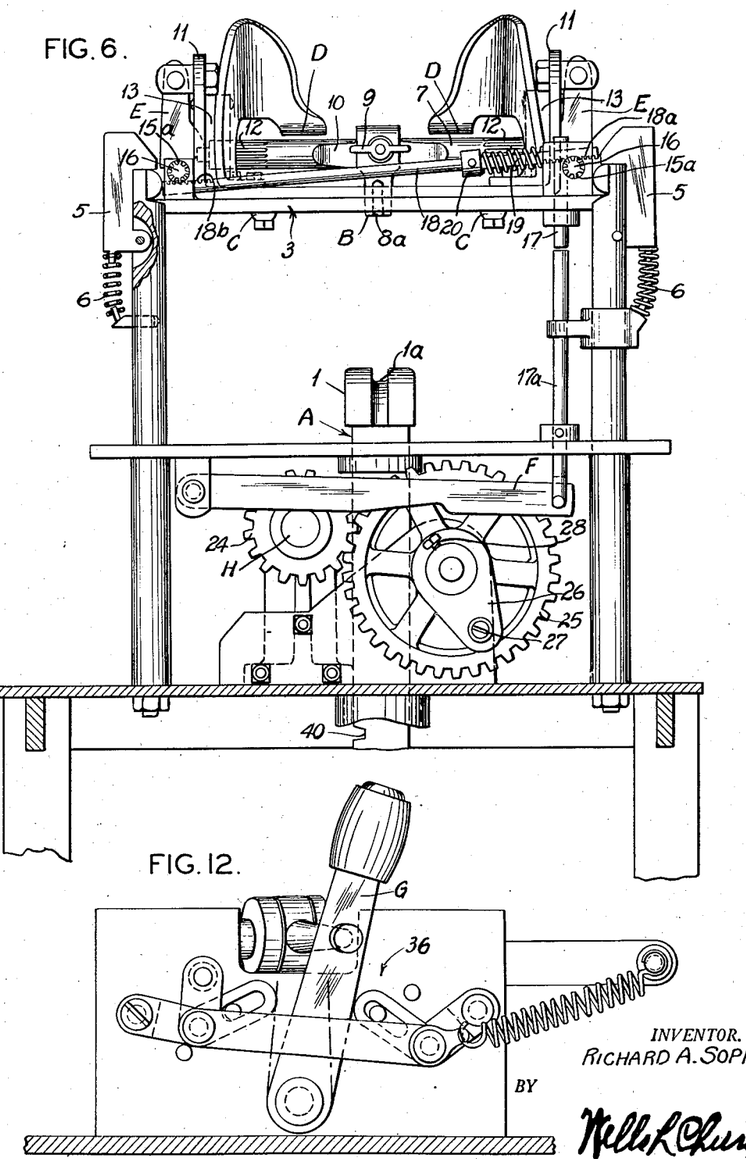
Figure 6 is a vertical side elevational view of the machine, said view being taken at right angles to Figure 2.
Figure 12 is a view similar to Figure 11, showing the control lever set in a position to cause the ram to move downwardly.
Figure 7:
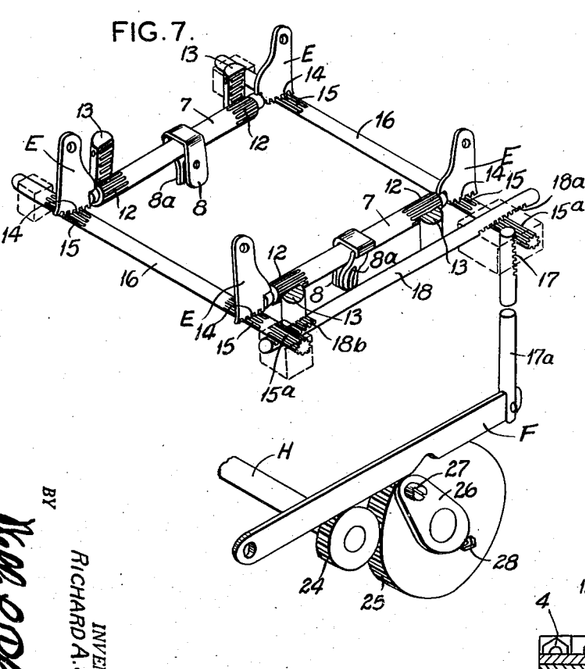
Figure 7 is a diagrammatic view, in isometric, illustrating the clamps and the locking mechanism for said clamps.

Preferably, the clamps B, the stabilizing bars C, and the pressure plates D, are mounted on a horizontally-disposed frame at the upper end of the machine, designated as an entirety by the reference character 3, which can be swung upwardly or shifted into the position shown in broken lines in Figure 2, so as to facilitate setting the casing X in operative position on the head piece of the ram A, preparatory to the eversion operation. The top frame 3 is herein illustrated as being hinged or rockably mounted on pivot pins 4 (see Figure 2), and latches 5 are provided (see Figure 6) for normally holding the frame 3 rigid, in a horizontal position, as shown in full lines in Figure 2, said latches 5 preferably consisting of hinged dogs that are normally maintained in a locking position by means of springs 6, shown in Figure 6. The clamps B, of which there are two, are mounted on or carried by two horizontally-disposed shafts 7 (see Figure 7) that are capable of a limited rocking movement and also capable of moving bodily upwardly and downwardly. Each of said clamps is preferably composed of two jaws or opposed portions 8 and 8ª, a thumb nut or equivalent device 9, which the operator in charge of the machine can manipulate so as to adjust the jaws 8 and 8ª, and thus vary the frictional pressure or clamping action of said jaws on the portion of the casing which they grip or embrace, and a spring 10 (see Figures 1, 3 and 6) arranged so as to cause said jaws to yieldingly grip or engage the casing. The outer jaws 8ª of the clamps B are preferably provided with slots so as to receive the center seam on the top side of the casing, and thus cause said jaws to bear evenly on the casing. In the machine herein shown each of the clamp-carrying shafts 7, previously mentioned, is mounted in elongated slots in a pair of stationary guides or brackets 11 rigidly attached to and projecting upwardly from the hinged top frame 3 of the machine, the elongated slots in said brackets being shown clearly in Figure 4 and designated by the reference character 11ª. Each of the shafts 7 is provided at its opposite ends with teeth 12 that extend longitudinally of the shaft, which teeth 12 are at all times in mesh with two stationary racks 13 that project upwardly from the top frame 3 of the machine. There are four of the racks 13, as shown in Figure 2, and when the ram A of the machine is at the end of its downward stroke, as shown in Figure 3, the toothed portions 12 of the shafts 7 are located at or near the lower ends of the racks 13. At this time the shafts 7 are locked against movement in any direction by four locking devices E that frictionally engage the end portions of the shafts 7. At a certain approximate point in the upward travel of the ram A, the locking devices E are rendered inactive, so as to release the shafts 7, whereupon the clamps B will be free to turn or assume such a position that they adapt themselves to the changed condition or position of the casing, and hence, have no tendency to tear the casing or strain the casing, as might result if the clamps B remained throughout the entire eversion operation in the same position which they assumed at the beginning of the eversion operation. During a large portion of the eversion operation, the shafts 7 are locked or held at rest by the devices E in such a position that the clamps B project downwardly, as shown in Figure 7, and also in Figures 2 and 3. After the locking devices E have been moved to release the shafts 7, the pull which the upward travel of the casing exerts on the clamps B causes the clamps B to rock inwardly, or towards each other, and this movement which the upwardly-traveling casing imparts to the clamps B causes the shafts 7 to move vertically, due to the action of the toothed portions 12 of said shafts on the stationary racks 13. Figure 4 illustrates the position of the clamps B after they have swung inwardly and upwardly into a substantially horizontal position. Figure 5 illustrates the clamps B after the shafts 7 have moved upwardly over the racks 13, so as to dispose the clamps B in an upwardly-projecting position. The locking devices E, which normally hold the clamps B and their supporting shafts 7 against movement, are pivotally mounted and are provided at their lower ends with racks or toothed portions 14 which at all times are in mesh with co-acting toothed portions 15 on a pair of parallel rock shafts 16 that are mounted in bearings on the top frame of the machine and disposed at right angles to the shafts 7 which carry the clamps B. As shown in Figure 7, one of the rock shafts 16 is rotated by means of a vertically-disposed actuating rack 17, to which upward movement is imparted by a cam operated lever F, said vertically-disposed actuating rack 17 having a toothed portion, as shown in Figure 7, that meshes with a toothed portion 15ª on one of the rock shafts 16. Rotary movement of this last mentioned rock shaft 16 is transmitted to the other rock shaft 16 by means of a counter rack bar 18, which, at one end, is provided on its underside with a rack 18ª that meshes with the toothed portion 15ª of the rock shaft 16 with which the actuating rack 17 is engaged, and which is provided at its opposite end, on its top side, with a rack 18ᵇ that engages a toothed portion 15ª on the other rock shaft 16. When the actuating rack 17 moves upwardly, looking at Figure 7, the two rock shafts 16, due to the counter rack bar 18 associated with said shafts, will rock in a direction to swing the locking devices E outwardly, or away from the ends of the shafts 7 that carry the clamps B, thus releasing the shafts 7. Similarly, when the rock shafts 16 turn or rotate in the opposite direction, the locking devices E will be restored to locking engagement with the clamp-carrying shafts 7. The restoration or movement of the locking devices E back to normal position in locking engagement with the clamp-carrying shafts 7, is effected by means of a coiled expansion spring 19 (shown in Figure 6), which is mounted on the counter rack bar 18 between a stationary abutment and a collar 20 on said rack bar. Due to the fact that the clamps B and the locking devices E for the shafts 7 which carry the said clamps, are all mounted on the hinged top frame 3 of the machine, it is necessary to form the vertically-disposed actuating rack 17 in two sections, disposed in vertical alignment with each other, and separated from each other by a joint or space. The top portion of said actuating rack is designated by the reference character 17, and the bottom portion, which is separated from the top portion by a joint or open space, is designated by the reference character 17ª. Such a construction permits the frame 3 to be raised or lowered without disturbing the cam-operated lever F that moves the vertically-disposed actuating rack 17 upwardly.

The operating mechanism of the machine which moves the ram A upwardly, and imparts movement to the cam-operated lever F which controls the operation of the locking devices E for the clamps B, can be constructed in various ways without departing from the spirit of my invention. Said operating mechanism preferably comprises a control lever G which the operator in charge of the machine can actuate to cause the ram A to move upwardly and also actuate at any point in the cycle of operations of the ram to stop the machine. As shown in the drawings, the ram A is provided with a rack 40, which at all times is in mesh with a pinion 21 on the drive shaft H that is driven by an electric motor (not shown) through a gear reduction unit, designated as an entirety by the reference character 22, and a selective gear set 23 interposed between the electric motor and the gear reduction unit 22. The control lever G of the machine is so arranged and combined with the selective gear set 23 that said control lever occupies a neutral position when the machine is at rest. When the control lever is shifted in one direction, the drive shaft H of the machine will start to revolve in a direction to cause the ram A to move upwardly, and when said ram reaches the end of its upward stroke, a toggle linkage or equivalent mechanism will be rendered operative to automatically shift or move the control lever back to its neutral position, whereupon the machine will stop with the ram A in its elevated position and the ball casing turned inside-out, with the ram positioned on the interior of the everted casing, as shown in Figure 5. After the everted casing has been removed from the ram, the operator shifts the control lever G in a position to cause the drive shaft H to revolve in the opposite direction, so as to move the ram downwardly back to its starting position, shown in Figures 2 and 3.

The drive shaft H is provided with a pinion 24 that meshes with a timing gear 25 (see Figures 6 and 7) which carries or is combined with a cam arm 26 provided with a laterally-projecting pin 27 that is disposed beneath the cam lever F previously mentioned. Preferably, the cam arm 26 is capable of being adjusted relatively to the timing gear 25, so as to vary the time in the cycle of operations of the machine when the action of the cam lever F on the vertically-disposed actuating rack 17 renders the locking devices E inoperative, so as to release the shafts 17 which carry the clamps B. In the machine herein shown the cam arm 26 is adjustably combined with the timing gear 25, or is held in adjustable relationship with said timing gear, by a set screw 28 in the hub of the cam arm 26 (see Figure 6). During a large portion of the upward stroke of the ram, the clamps B are locked in the position shown in Figure 3, and in Figure 7, i. e., in a position in which the opposed jaws of said clamps project downwardly over the opposed end portions of the bladder opening in the casing, and hence, prevent or counteract the tendency of the top portion of the casing to rise or move upwardly, during a considerable portion of the upward thrust which the ram A exerts on the underside of the casing. However, as the ram approaches the end of its upward stroke, the mechanism interposed between the cam lever F and the locking devices E, moves said locking devices in a direction to release the shafts 7 that carry the clamps B. Thereafter, as the ram continues to move upwardly, the pull or force which the casing exerts on the clamps B causes said clamps to turn first into a horizontal position, and then into an upwardly-projecting position, as previously described and as clearly illustrated in Figures 4 and 5. The above described shifting of the clamps from a downwardly-projecting position, wherein they oppose upward movement of the top portion of the casing, into an upwardly-projecting position, wherein the casing can pull out of said clamps, is, as previously stated, effected by the bodily upward movement of the shafts 7 over the stationary racks 13. As soon as the casing disengages itself from the clamps B, the clamp-carrying shafts 7 travel downwardly over the racks 13, due to gravity, and in such downward travel, cause the clamps B to be restored to their normal downwardly-projecting position, wherein the shafts 7 become locked by the locking devices E, that are restored to their normal locking position by the force of the spring 19, previously mentioned.

Figure 8:
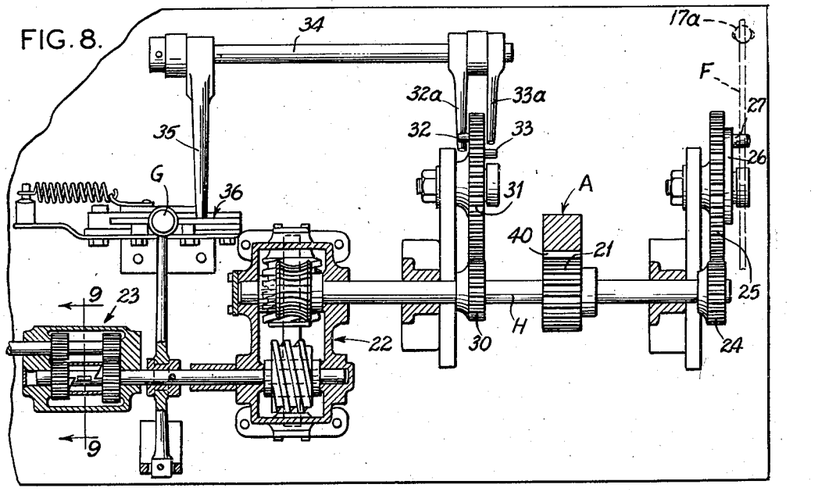
Figure 8 is a horizontal sectional view, taken on the line 8—8 of Figure 2.
Figures 9, 10:
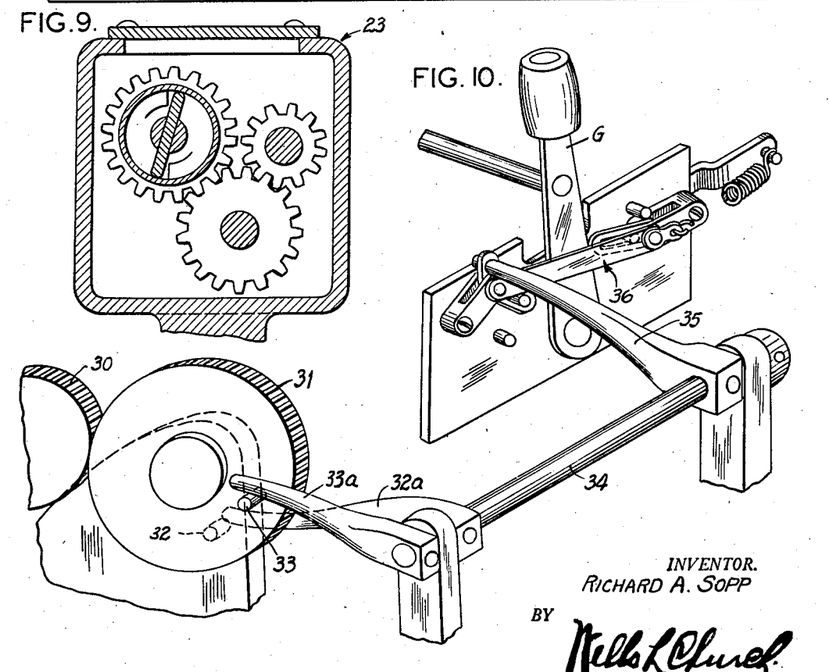
Figure 9 is a vertical sectional view, taken on the line 9—9 of Figure 8.
Figure 10 is a diagrammatic view, in isometric, illustrating the control lever and the mechanism used to automatically shift said control lever into neutral, at the end of the upward stroke and at the end of the downward stroke of the ram.

The drive shaft H is also provided with a pinion 30 that meshes with a timing gear 31 which imparts movement to the toggle linkage, previously mentioned, that is associated with the control lever G. As shown in the drawings, particularly Figures 3, 8 and 10, the timing gear 31 is provided with two pins 32 and 33 that project laterally in opposite directions from said gear. The pin 32 is so disposed that when the ram A reaches the end of its upward stroke, said pin will engage an arm $32^a$ on the rock shaft 34, and moves said shaft in a direction to cause a lever 35 thereon to impart movement to a toggle linkage, designated as an entirety by the reference character 36, that is associated with the control lever G, and which causes said control lever to shift into neutral position, whereupon the drive shaft H will come to rest. The other pin 33 on the timing gear 31 is so disposed that, during the downward stroke of the ram, as said ram approaches its lowermost position, said pin 33 will engage an arm $33^a$ on the rock shaft 34 and turn said shaft in a direction to cause the lever 35 thereon to co-operate with the toggle linkage 36 to restore the control lever G to its neutral position, whereupon the machine will stop. Thus, it will be seen that in my machine the operator can start and stop the machine at will, simply by shifting the control lever G in one direction or the other, and during the cycle of the ram, when it approaches its extreme position while traveling in either direction, an automatic mechanism acts to shift the control lever into neutral position, so as to stop the machine.

To recapitulate, the machine above described is designed primarily for everting or turning inside-out a sewed leather ball casing that is sewed wrong side out, and which at the completion of the sewing operation, is in the condition shown in Figure $4^a$ of the drawings. To install the casing in the machine, the operator releases the latches 5, swings the top frame 3 of the machine upwardly into the position shown in broken lines in Figure 2, and then sets the casing X on the head piece of the ram A, with the center seam on the bottom side of the casing positioned in a groove $1^a$ in the head piece of the ram, said center seam and groove co-acting with each other to hold the casing centered with relation to the ram. The top frame 3 is then swung downwardly into its normal locked position, and the casing is engaged with the clamps B by pulling the opposed end portions of the bladder slit $x^2$ in the casing upwardly into the jaws of the clamps B. The top side or top portion of the casing is then manipulated in such a way as to be sure that the pressure plates D will be disposed above the top portion of the casing, and the two seams, that join the side portions of the casing to the top portion of the casing, will be located outside of the stabilizing bars C, as shown in Figure 3. The control lever G is then shifted from neutral into the position to cause the ram A to move upwardly, whereby the top portion of the casing will be pressed against the stabilizing bars C and the pressure plates D, and the bottom portion of the casing contacted by the head piece of the ram will be forced upwardly through the bladder slit or opening $x^2$ in the top portion of the casing. During a considerable portion of the upward stroke of the ram, the clamps B are securely locked in a downwardly-projecting position (shown in Figure 3), by the locking devices E which engage or act on the ends of the rock shafts 7 that carry the clamps B, but at a certain period in the upward stroke of the ram, the timing gear 25 reaches such a position that the cam lever F imparts upward movement to the actuating rack 17, whereupon the locking devices E will be rendered inoperative or disengaged from the shafts 7. The clamps B, which are now free to move, will swing upwardly, first, into a substantially horizontal position, as shown in Figure 4, and then into an upwardly-projecting position, as shown in Figure 5, due to the upward pull that the casing exerts on the clamps B. This movement of the clamps B inverts the portions of the casing that are gripped or embraced by the clamps B, and thus not only effectively prevents the clamps from tearing or straining the casing, but also causes the clamps to be disposed in such a position that the casing can pull out of the jaws of the clamps, during the final portion of the upward stroke of the ram, the machine stopping automatically after the ram has moved upwardly high enough to disengage the casing from the clamps B. As previously explained, such automatic stopping of the machine when the ram reaches the end of its upward stroke, is effected by the timing gear 31 which imparts movement to the rock lever 35 and toggle linkage 36 associated with the control lever G. After the everted casing has been removed from the ram, the control lever is shifted into a position to cause the ram to move downwardly, and during the downward stroke of the ram, the timing gear 31, by co-acting with the rock lever 35 and toggle linkage 36, causes the control lever G to shift back to neutral, thus causing the drive shaft of the machine to stop when the ram reaches the end of its downward stroke.

The above described machine is easy to control, as the ram can be instantly stopped and started, at the will of the operator in charge of the machine; it requires practically no skill or strength on the part of the operator; and it will turn a sewed leather ball casing or similar shell-like flexible article inside-out quickly and without liability of tearing or straining the material of which the casing is constructed.

Having thus described my invention, what I claim as new and desire to secure by Letters Patent is:

1. A machine for everting a ball casing or similar shell-like, flexible article provided with a slit, comprising a holding means adapted to be engaged with the perimeter or peripheral edge of the slit in the casing, a co-acting means adapted to be engaged with the outside of the casing at a point remote from the slit in the casing, and mechanism for moving one of said means relatively to the other in a direction to turn the casing inside-out, said holding means being constructed so as to automatically change its position to adapt itself to the changing condition or position of the casing during the eversion operation, for the purpose of preventing said holding means from tearing or imposing an undue strain on the casing.

2. A machine for everting a ball casing or similar shell-like article provided with a slit, comprising clamps adapted to embrace or grip the perimeter or peripheral edge of the slit in the casing, a member that is adapted to be engaged with the outer side of a portion of the casing remote from the slit in the casing, mechanism for producing relative movement between said clamps and member to cause said member to, in effect, push the portion of the casing which it engages through the slit in the casing far enough to turn the casing inside-out, and a mechanism for causing said clamps to rock in such a direction during the eversion operation that they will exert no undue strain on the casing and the casing will be automatically disengaged from said clamps at the completion of the eversion operation.

3. A machine for everting a ball casing or similar article provided in its top side with a slit, comprising holding devices adapted to be engaged with the slitted top portion of the casing, and means for exerting pressure on the bottom portion of the casing in such a direction as to push said bottom portion, together with the side portions of the casing, through the slit in the top portion of the casing, said holding devices being so constructed that near the end of the eversion operation the casing will automatically disengage itself from said devices.

4. A machine for everting a flexible foot ball casing or similar article provided with a slit, comprising clamps for gripping or embracing the perimeter or peripheral edge of the slit in the casing, and a ram for engaging the bottom portion of the casing and moving same upwardly to a point beyond said clamps so as to force the bottom portion and side portions of the casing through said slit, said clamps being mounted so as to occupy a downward-projecting position at the beginning of the eversion operation and to turn automatically into an upwardly-projecting position during the eversion operation.

5. A machine for everting a ball casing or other flexible, shell-like article provided with a slit, comprising bifurcated clamps that are adapted to be engaged with the perimeter edge of the slit in the casing, a vertically-movable ram that is adapted to engage the underside or bottom of the casing and move upwardly to a point beyond said clamps, and a stabilizing means that tends to prevent the top portion of the casing from collapsing during the eversion operation.

6. A machine of the kind described in claim 5, equipped with mechanism for causing said clamps to change from a downwardly-projecting position into an upwardly-projecting position during the eversion operation, the stabilizing means of the machine being so constructed that the casing can disengage itself from said stabilizing means near the end of the eversion operation.

7. A machine for everting a foot ball casing or similar flexible, shell-like article provided with a slit, comprising bifurcated clamps adapted to be engaged with the opposed ends of the slit in the top portion of the casing, a ram that is adapted to engage the bottom portion of the casing and move upwardly to a point beyond said clamps, and pressure plates against which the top portion of the casing is forced during the upward travel of the ram.

8. A machine of the kind described in claim 7, provided with stabilizing bars disposed so as to tend to hold the top portion of the casing in a distended condition, during the eversion operation.

9. A machine for everting a football casing or similar flexible, shell-like article provided in its top side with a slit, comprising bifurcated clamps disposed so as to project downwardly over the perimeter or peripheral edge of the slit in the casing, a ram that is adapted to engage the underside or bottom portion of the casing and move upwardly to a point beyond said clamps, stationary pressure plates arranged in overlapping relationship with the top portion of the casing, and stabilizing bars in overlapping relationship with the top portion of the casing, disposed so as to tend to hold said top portion in a distended condition during the major portion of the eversion operation.

10. A machine of the kind described in claim 9, provided with mechanism for causing said clamps to shift automatically during the eversion operation into such a position that they do not offer resistance to the upward movement of the top portion of the casing during the final portion of the upward stroke of the ram.

11. A machine for everting a ball casing or other similar flexible article provided with a slit, comprising a ram provided with a head piece equipped with a groove that is adapted to receive a sewed seam on the bottom portion of the casing, clamps above said ram having jaws into which the opposed end portions of the slit in the casing can be inserted during the operation of setting the casing in the machine, said jaws projecting downwardly, stationary pressure plates disposed above the top portion of the casing, stabilizing bars extending substantially parallel to the slit in the casing and adapted to be engaged with seams on the top sides of the casing so as to tend to prevent the top portion of the casing from collapsing, and mechanism for moving the ram upwardly to a point beyond said clamps, pressure plates and stabilizing bars.

12. A machine of the kind described in claim 11, provided with a shiftable or movable top frame that carries said clamps, pressure plates and stabilizing bars.

13. A machine of the kind described in claim 11 equipped with rock shafts that carry said clamps, locking devices for holding said shafts against movement, and means for rendering said locking devices inactive during the eversion operation so as to permit said shafts to turn in such a direction that the clamps will adapt themselves to the changing condition or position of the top portion of the casing during the eversion operation.

14. A machine for everting a ball casing or similar flexible, shell-like article provided in its top side with a slit, comprising clamps that are adapted to be engaged with the perimeter or peripheral edge of the slit in the casing, a ram that is adapted to engage the bottom portion of the casing and move upwardly to a point beyond said clamps, said clamps normally projecting downwardly, rock shafts that carry said clamps, locking devices for holding said shafts against movement, means for rendering said locking devices inactive during the eversion operation, whereby the pull exerted by the casing on said clamps will cause said shafts and the clamps thereon to rock, and means for causing said shafts to move bodily in an upward direction when said shafts are rocked by the upward pull exerted on the clamps by the casing.

15. A machine for everting a foot ball or other flexible, shell-like article provided in its top side with a slit, comprising an upwardly-movable ram on which the casing is adapted to be positioned with the slitted top portion of the casing presented upwardly, and a frame at the upper end of the machine provided with co-acting devices that are adapted to be engaged with the top portion of the casing so as to tend to hold it in a distended condition and resist upward movement of same during part of the upward travel of the ram, whereby the bottom and side portions of the casing will be pushed upwardly through the slit in the top portion of the casing, after which said top portion will automatically disengage itself from the co-acting devices on said frame.

16. A machine of the kind described in claim 15, provided with means for enabling said frame to be shifted into an inactive position so as to facilitate setting the casing on the ram.

17. A machine for everting a foot ball casing or similar flexible, shell-like article, provided in its top side with a slit, comprising an upwardly-movable ram provided with a groove that is adapted to receive a sewed seam on the bottom portion of the casing, a frame provided with pressure plates disposed above the top portion of the casing so as to resist upward movement of said top portion during part of the upward stroke of the ram, stationary stabilizing bars on said frame adapted to be engaged with sewed seams on the top portion of the casing, rock shafts on said frame provided with adjustable clamps that are adapted to embrace the perimeter or peripheral edge of the slit in the casing, said clamps projecting downwardly at the beginning of the eversion operation, locking devices for holding said rock shafts against movement, means for disengaging said locking devices from said rock shafts at a certain point in the eversion operation, and stationary racks in mesh with toothed portions on said rock shafts for causing said shafts to turn and move bodily in an upward direction so as to dispose said clamps in an upwardly-projecting position near the end of the eversion operation.

18. A machine of the kind described in claim 17, in which the mechanism for operating the ram comprises a control lever that can be actuated to start or stop the machine at the will of the operator, and means for automatically stopping the machine when the ram reaches the end of its upward stroke.

RICHARD A. SOPP.